(12) United States Patent
Broderick

(10) Patent No.: US 6,874,645 B2
(45) Date of Patent: Apr. 5, 2005

(54) MEDIA DISC STORAGE AND DISPLAY DEVICE

(76) Inventor: David Lee Broderick, 651 WindChase La., Stone Mountain, GA (US) 30083

( * ) Notice: Subject to any disclaimer, the term of this patent is extended or adjusted under 35 U.S.C. 154(b) by 0 days.

(21) Appl. No.: 10/361,064

(22) Filed: Feb. 10, 2003

(65) Prior Publication Data

US 2003/0155316 A1 Aug. 21, 2003

Related U.S. Application Data

(60) Provisional application No. 60/357,805, filed on Feb. 15, 2002.

(51) Int. Cl.$^7$ .................................................. A47F 7/00
(52) U.S. Cl. ......................... 211/40; 206/308.1; D6/407
(58) Field of Search ........................... 211/40; 312/9.9, 312/9.53, 9.54, 9.56, 9.58; 206/308.1; D6/407; 40/124.2

(56) References Cited

U.S. PATENT DOCUMENTS

| | | | |
|---|---|---|---|
| 2,968,882 A | * | 1/1961 | Ozeki ........................... 40/374 |
| 4,940,147 A | * | 7/1990 | Hunt ............................ 211/40 |
| 4,951,826 A | | 8/1990 | Tompkins |
| 5,040,687 A | | 8/1991 | Whittington |
| 5,052,564 A | | 10/1991 | Zuzack |
| D322,725 S | * | 12/1991 | Strickland, III ............... D6/631 |
| 5,232,089 A | * | 8/1993 | Kim ......................... 206/308.1 |
| 5,462,177 A | * | 10/1995 | O'Donnell .................... 211/40 |
| 5,533,614 A | | 7/1996 | Walker |
| 5,769,244 A | | 6/1998 | Wyatt |
| 5,988,405 A | | 11/1999 | Weisenburger |
| 5,996,815 A | * | 12/1999 | Walters et al. ................. 211/40 |
| 6,003,687 A | * | 12/1999 | Wyatt ........................... 211/40 |
| 6,015,050 A | * | 1/2000 | Gilbertson .................... 211/40 |
| 6,622,866 B2 | * | 9/2003 | Roberts et al. .............. 206/473 |

* cited by examiner

Primary Examiner—Robert W. Gibson, Jr.
(74) Attorney, Agent, or Firm—Mark Levy & Associates

(57) ABSTRACT

The wall mountable Compact Disc Storage and Display Device of the present invention provides the user with a new and novel method for the storage of compact discs or jewel cases. Contents are stored in a forward facing manner within individual pockets incorporated into the design. Jewel cases are fitted within the pocket and may be easily removed by pivoting on the edge of a raised platform located within the pocket. Compact discs may be stored independently of the jewel case and are held in place by an interference fit to a clamp at the center of a recess in the platform. The invention presents the user with the advantage of being able to arrange the contents of the cabinet such that the graphic work printed on the compact disc or included as an insert to the compact disc jewel case may be used to create a decorative wall hanging.

7 Claims, 4 Drawing Sheets

MEDIA DISC STORAGE AND DISPLAY DEVICE

FIELD OF THE INVENTION

This application claims priority to Provisional Patent Application Ser. No. 60/357,805 filed on Feb. 15, 2002 and relates to a storage device for multiple media discs or media disc jewel cases. Specifically, the invention is a wall mountable or self supporting storage and display container for media discs, media disc jewel cases, or a combination thereof.

BACKGROUND OF THE INVENTION

Compact Discs or "CDs", have become very popular as a storage device for digital media and may contain computer software, games, or music. The compact discs are often sold in protective plastic boxes called jewel cases. Users often stack the jewel cases and discs in random stacks or in racks which are little better than a random stack. The printing on the spine of the jewel case is usually of small type size, which makes it difficult for the user to ascertain which CD is the one he requires when the discs are stored in such a fashion.

A common problem among home storage devices is that the disc may only be stored by first placing the disc in a jewel case. The jewel case may then be placed in the storage device in either a horizontal or vertical manner. Normally, the displayed portion is a small cross-sectional area of the end of the jewel case on which the title and/or performer is usually printed. In this manner, the aesthetically pleasing and artistic graphic work usually printed on the disc, as well as on an insert within the jewel case, is disadvantageously hidden when stored. The title that is available for ready display is in small, hard to read print. Other prior art CD holders may hold only the disc, but not the jewel case. Many of the prior art CD holders are also difficult to use.

U.S. Pat. No. 5,040,687 to Whittington and U.S. Pat. No. 4,951,826 to Tompkins are examples of CD holders that are wall mounted and display the jewel cases. Both of these holders use hook and loop fasteners to hold the jewel case in a frame. The hook and loop fasteners attaches directly to the back panel. Neither of these devices allows the disc itself to be stored separately from the jewel case.

U.S. Pat. No. 5,988,405 to Weisenburger is another example of a CD holder which allows the jewel case to be displayed. A cut-out area in the sides allows the user's fingers to grasp the sides of the jewel case and snap it in or out of the frame. Once again, no provision is made for storing the disc independently of the jewel case.

U.S. Pat. No. 5,769,244 to Wyatt is an example of a wall mounted CD holder which uses a lip and a spring to retain the CD in the holder. The lip captures the edge of the jewel case, while the spring retains it at an acute angle to the back of the holder. There is no provision to store the disc separately from the jewel case.

U.S. Pat. No. 5,533,614 to Walker discloses a wall mounted CD holder which allows the discs to be displayed. The holder clamps the center of the CD and holds it in a recessed area which is sized to fit the CD. The recess allows the disc to be stored essentially flush with the face of the holder. There is no provision to store the jewel case.

U.S. Pat. No. 5,052,564 to Zuzack teaches a CD holder which allows the jewel case to rest on the horizontal component of a frame. A groove helps to retain the jewel case in the frame. A "kick bar" or pivot pin allows the CD to be easily ejected by pressing on with a finger. Once again, no provision is made for storing the disc independently of the jewel case.

In view of the prior art devices discussed above, then, it is clear that there is a need for a media disc storage device which allows for display of the CD cover, allows the disc to be stored separately from the jewel case, and is easy to use.

It is therefore an object of the present invention to provide a new and novel media disc storage and display device which allows for the frontal display of media discs and/or media disc jewel cases.

It is another object of the present invention to provide a new and novel Media disc Storage and Display Device which is easy to use.

It is still another object of the present invention to provide a new and novel Media disc Storage and Display Device which allows the disc and its jewel case to be stored separately.

It is yet still another object of the present invention to provide a new and novel Media disc Storage and Display Device device which provides a raised platform formed within the pocket for easy removal of a media disc jewel case.

Other and further objects, features, and advantages of the present invention will become apparent to those skilled in the art by reference to the drawings and to the detailed description of the preferred embodiment presented herein.

SUMMARY OF THE INVENTION

The wall mountable media disc storage and display device of the present invention provides the user with a new and novel method for the storage of compact discs, jewel cases, or a combination thereof. The compact disc and its jewel case may be stored separately or together, in a forward facing manner, displaying the graphic work printed on the compact disc or included as an insert to the compact disc jewel case. Jewel cases are fitted within the pockets and are easily removed by pivoting on the edge of a raised platform formed within the pocket.

The jewel case may be removed from the cabinet by pressing on the front of the case in a location forward of the edge of the platform. The case is pivoted outward on the front edge of the platform and is, thus, easily removed by grasping with the thumb and fingers.

The disc is held by an interference fit to a clamp formed within a recess in the center of each pocket. The disc may be removed by pressing on the clamp and simultaneously pulling on the edge of the disc. The entire assembly of pockets are grouped in an aesthetically pleasing array and may be housed within a cabinet having a transparent door hinged to the front. The entire case may be designed to look like a large compact disc jewel case. The invention presents the user with the advantage of being able to arrange the contents of the cabinet such that the graphic work printed on the compact disc or included as an insert to the compact disc jewel case may be used to create a decorative wall hanging.

The user may conveniently take advantage of this feature to create aesthetically pleasing wall hangings which may be arranged as desired. The platform and pivot mechanism increase the ease with which the stored compact disc jewel case may be removed.

An inherent advantage to the user in the utility of the design of the present invention is the ability to store the compact disc independently of the jewel case. Added advantages are the savings of shelf space for the storage of compact discs, and the ability to quickly scan and select a stored compact disc or compact disc case from a distance.

In an alternative embodiment, the Media disc Storage and Display Device may be provided with foldable supports or a base, so that it can be made to rest on a table or shelf, while still giving the user the option of wall mounting. A handle could be provided so as to make the Media disc Storage and Display Device portable.

The device may be constructed in various shapes and sizes to optimize storage capacity and appearance. It may be constructed with similar storage features on both front and back such that the potential storage capacity may be doubled. As such, the device may be mounted on a rotating base, so that access to the opposite side may be gained by rotating about a vertical axis. In a wall mounted arrangement, the device may simply be turned 180 degrees and remounted.

The compartments may also be dimensioned to hold mini discs, digital video disks also known as DVD's, laser disks, or other similar media and their cases. The depth of the pockets may be increased so as to allow a plurality of discs or jewel cases to be stored in one pocket. Any or all of these options may be combined to create alternatives to the design of the exemplary embodiment.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Figure 1:
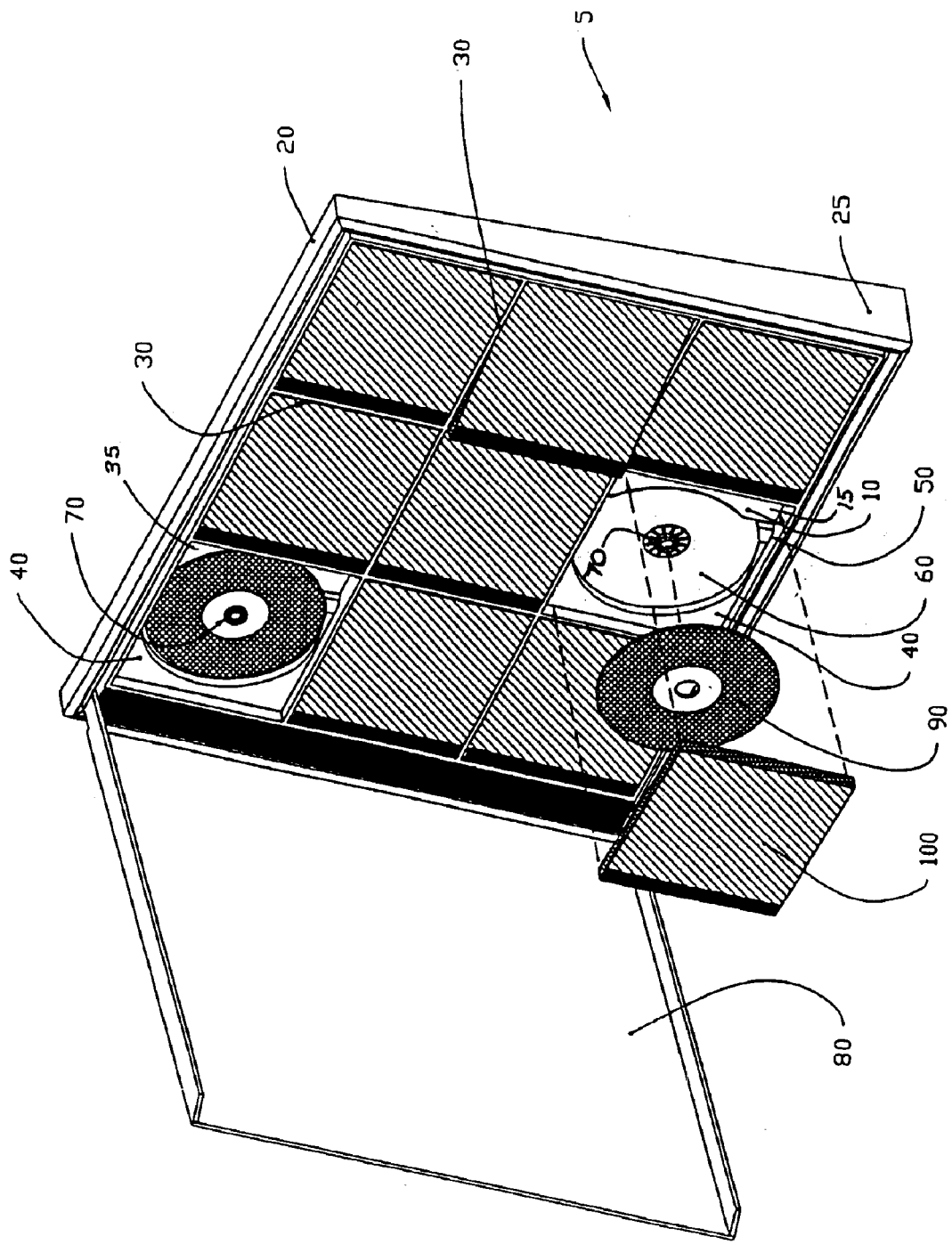
FIG. 1 is a perspective view of a full assembly of the present invention. A rectangular pocket is shown having the jewel case and media disc removed and suspended in front. The figure also shows an individual pocket having a media disc, independent of the jewel case, mounted to a clamp within the pocket.

FIG. 1 is a preferred embodiment of the Media Disc Storage and Display Device 5 of the present invention in full assembly. The device is built on a Rigid Panel 10, having Partitions 30, on the Forward Surface 15 running perpendicular to one another to form a number of individual Pockets 35 for use as storage compartments. Pockets 35 are dimensioned such that contents may be stored in a forward facing manner and may be grouped to optimize storage capacity, shape or appearance. Pockets 35 may also be configured to hold other electronic recorded or recordable media such as mini discs, DVDs, laser disks, or any similar media, along with the storage case or box in which such media are sold. The depth of the Pockets 35 may also be increased so as to hold a plurality of such content. The device may be enclosed in a Frame 20 having Frame Tapered Edge 25, of increasing thickness from top to bottom, such that when mounted to a vertical surface, the device is tilted up from the bottom. This arrangement provides added security to the contents therein. Within each Pocket 35, a Platform 40 is formed against the Forward Surface 15 of the Rigid Panel 10. The Media Disc Jewel Case 100 rests against the Platform 40 and may be removed by pivoting against the Platform Edge 50. In order to accommodate the Media Disc 90 independent of the Media Disc Jewel Case 100, a Recess 60 is voided within the Platform 40, and dimensioned to accommodate such a Media Disc 90, which may be secured to a Radially Ribbed Clamp 70 formed about the center of Recess 60.

A Transparent Door 80 is hinged to the front of the device and may be pivoted to one side in order to allow access to the contents stored within. The Transparent Door 80 is an optional feature which serves primarily to improve the appearance of the device, create an overall appearance reminiscent of an individual Media Disc Jewel Case 100 and also function as a dust cover.

Figure 2:
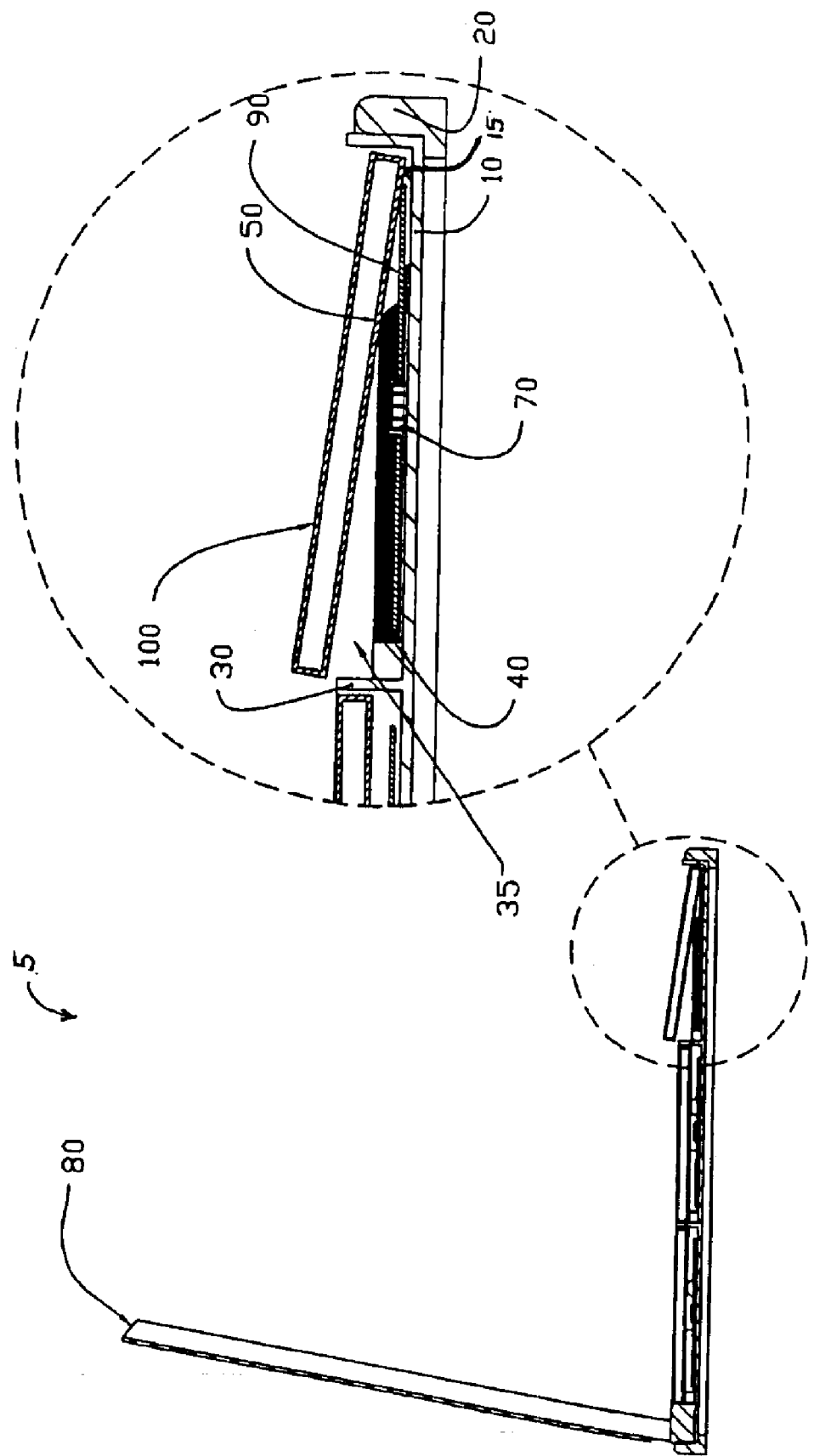
FIG. 2 is a cross sectional view of a depiction of the present invention showing the individual media discs secured to clamps within the pockets. A media disc jewel case is depicted pivoted on the edge of a raised platform in accordance with the removal procedure of the invention.

FIG. 2 shows a cross section of the device with Transparent Door 80 pivoted open. When closed, Transparent Door 80 covers the entire front of the device to create an enclosed cabinet. An enlarged cross-sectional view of a single Pocket 35 depicts Media Disc Jewel Case 100, pivoted on Platform Edge 50. Media Disc 90 is shown secured to Radially Ribbed Clamp 70, located about the center of Pocket 35 as defined by Partitions 30. Frame 20 surrounds the perimeter of the device.

Figure 3:
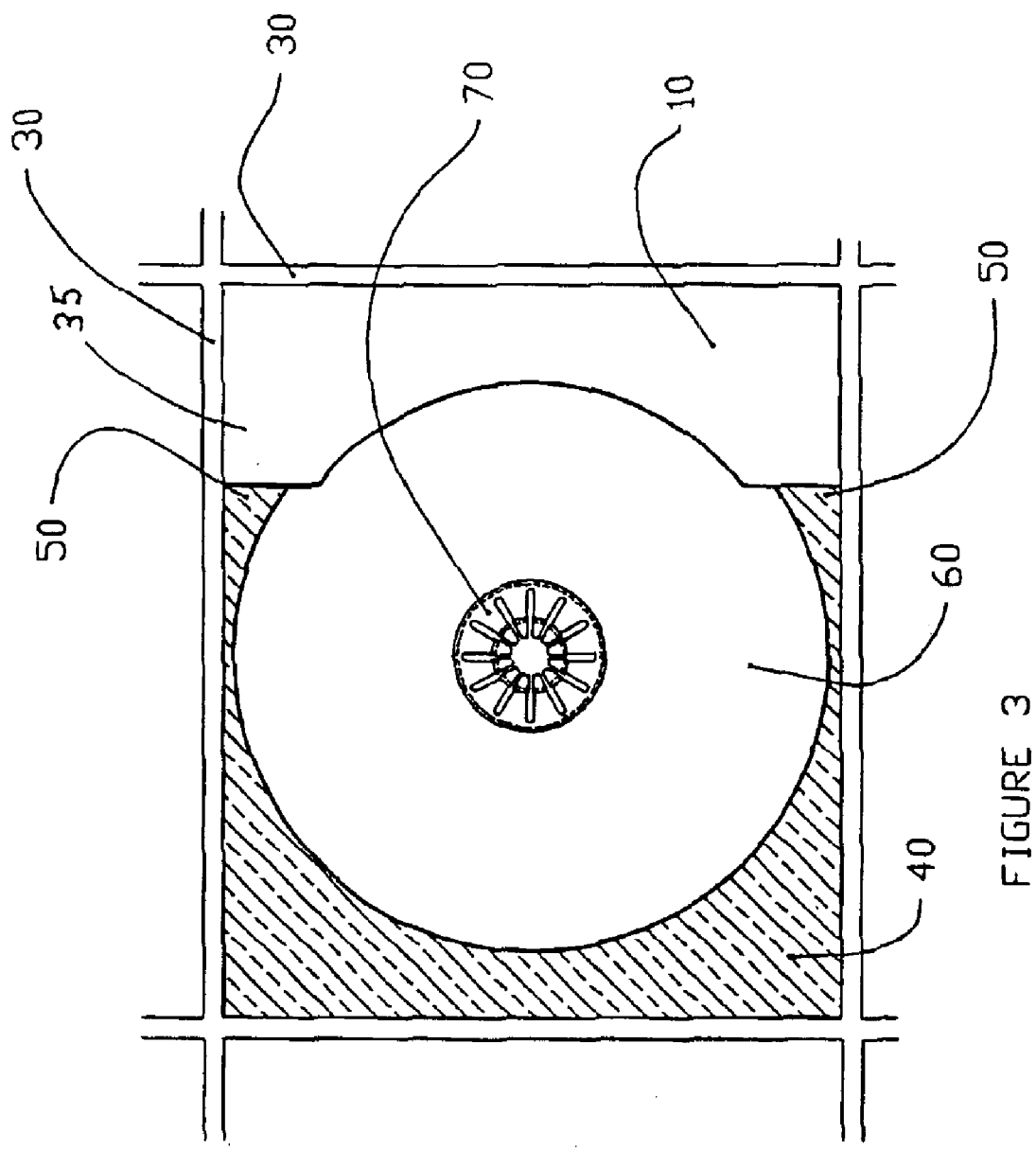
FIG. 3 is a direct view of an individual pocket of the present invention with partitions on all sides. A raised platform is depicted shaded within the boundary of the pocket. A circular recess with radial clamp in center is shown voided within the platform.

FIG. 3 shows the details of an individual unoccupied Pocket 35. The Platform 40 is formed against the Rigid panel 10, which is the floor of the Pocket 35. The Platform 40 runs the width of the Pocket 35 and covers an area from one side to a point forward of the center of the Pocket 35. A Recess 60 is formed within the Platform 40, and is dimensioned to accommodate an individual Media Disc 90 (not shown in this view). A Radially Ribbed Clamp 70 is formed about the center of the Recess 60 and is dimensioned to provide an interference fit to the center hole of Media Disc 90. Partitions 30, form a boundary around the perimeter of Pocket 35, and are spaced such that Media Disc Jewel Case 100 may be placed within Pocket 35 in a forward facing manner and may be secured by means of an interface with said Partitions 30.

Figure 4:
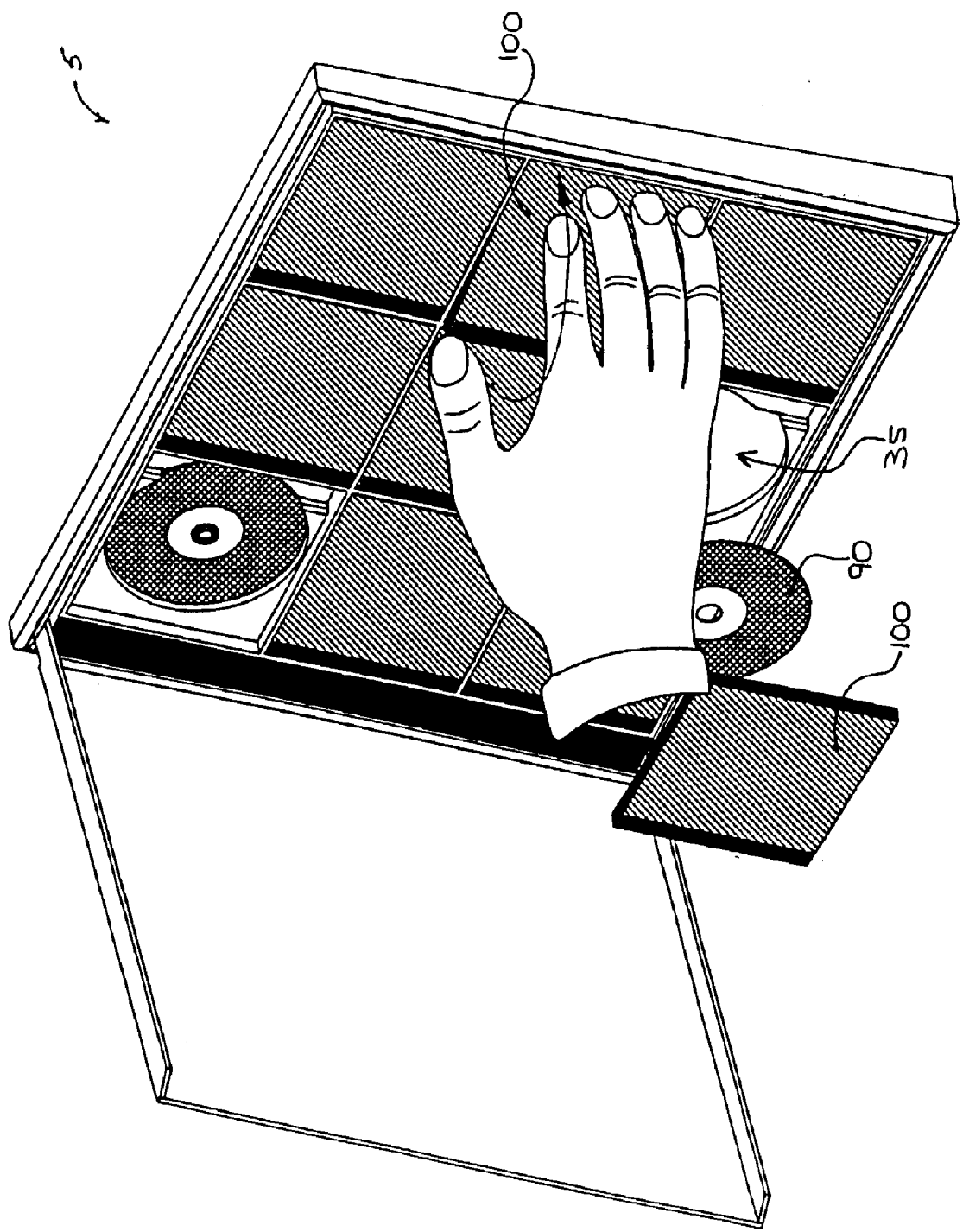
FIG. 4 is a perspective view of a removal of an individual jewel case from the present invention by pressing on the front of the case in a location forward of the edge of the platform.

FIG. 4 illustrates the method of removal of an individual Media Disc Jewel Case 100. Pressing on Media Disc Jewel Case 100 with the fingertips in an area forward of Platform Edge 50 (not shown in this view) enables Media Disc Jewel Case 100 to be pivoted up from the opposite side. Once pivoted in such a manner, Media Disc Jewel Case 100 may be easily grasped with the thumb and fingers and removed.

When Media Disc 90 is stored independently of its Media Disc Jewel Case 100, Media Disc 90 may be easily removed from Pocket 35 by pressing on Radially Ribbed Clamp 70 with an index finger and simultaneously pulling on the edge of the Media Disc 90 with thumb and remaining fingers.

The entire assembly of Pocket 35 are grouped in an aesthetically pleasing array, preferably in a rectangular format.

In alternate embodiments, the Platform 40 may be reduced in size and located about the center of the Pocket 35 such that the Media Disc Jewel Case 100 may be pivoted to the left or right of Platform edge 50.

Retractable supports or a base may be attached to Frame 20 to make the device self-supporting.

The device may be constructed with similar storage features on both front and back such that the potential storage capacity may be doubled. As such, the device may be mounted on a rotating base, so that access to the opposite side may be gained by rotating about a vertical axis. In a wall mounted arrangement, the device may simply be turned 180 degrees and remounted.

A handle may also be attached to Frame 20, so as to make the device easily portable.

The device may or may not have a Frame 20 or Transparent Door 80 attached, and may be of a variety of shape or sizes to accommodate any desired number of Media Disc 90 and/or Media Disc Jewel Case 100.

Any or all of these options may be combined to create alternatives to the exemplary embodiment. Numerous other modifications may be made without departing from the principle of the invention.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A wall mountable CD storage and display unit for compact discs and compact disc jewel cases comprising:
   a) a rigid panel having a forward surface, a rearward surface and a perimeter;
   b) a frame mounted to the perimeter of said rigid panel and projecting forward from a forward surface thereof, said frame including upper and lower edge portions and corresponding side edge portions, said side edge portions of said frame being dimensioned with an increasing taper from top to bottom, and said upper and lower edge portions having a thickness substantially identical to a corresponding thickness of an adjoining end of said side edge portions;
   c) a series of raised partitions formed on the forward surface of said rigid panel, provided in rows perpendicular to one another in order to create a crossing pattern and rectangularly shaped compartments and compartmental areas; and
   d) each of said compartment areas being sized to correspond to the dimensions of an individual electronic media disc jewel case, such that said electronic media disc jewel case may be fitted within the compartment.

2. The wall mountable storage and display unit of claim 1 further comprising a transparent door covering the entire front of said compartmental area to form an enclosed cabinet.

3. The wall storage and display container of claim 2 wherein said door is hinged to the cabinet such that access may be gained by pivoting the door to one side.

4. The storage and display unit of claim 1 further comprising: a raised platform disposed within each of said individual compartments and formed against the forward surface of said rigid panel, said raised platform extending from a first vertical edge of the compartment to a second vertical edge disposed at a position intermediate a vertical centerline of said individual compartment and an opposite vertical edge of said individual compartment, whereby said electronic media case may be pivoted against said second vertical edge of said platform for ease of removal of said jewel case.

5. The storage and display unit of claim 4, wherein within at least one of said platforms has a circular recess disposed therein, said recess being sized to correspond to the dimension of an individual electronic media disc, independent of the media disc case.

6. The storage and display unit of claim 5, further comprising at the center of each recess, a circular clamp dimensioned to provide an interference fit through the center hole of the media disc.

7. The storage and display unit of claim 1, modeled and dimensioned in the distinct likeness of an individual electronic media disc jewel case such that in appearance it may be likened to and described as an oversized media disc jewel case.

* * * * *